United States Patent [19]

Kailasam et al.

[11] Patent Number: 5,306,807
[45] Date of Patent: Apr. 26, 1994

[54] PROCESS FOR ISOLATING POLYMER RESINS FROM SOLUTIONS

[75] Inventors: Ganesh Kailasam, Schenectady; Godavarthi S. Varadarajan, Niskayuna, both of N.Y.

[73] Assignee: General Electric Company, Schenectady, N.Y.

[21] Appl. No.: 99,504

[22] Filed: Jul. 30, 1993

[51] Int. Cl.$^5$ ................................. C08F 6/10
[52] U.S. Cl. .................... 528/483; 528/491; 528/497; 528/498
[58] Field of Search ............... 528/483, 491, 497, 498

[56] References Cited

U.S. PATENT DOCUMENTS

| | | | |
|---|---|---|---|
| 3,508,339 | 4/1970 | Neblett et al. | 34/10 |
| 4,603,194 | 7/1986 | Mendiratta et al. | 528/491 |
| 4,634,761 | 1/1987 | Mendiratta et al. | 528/491 |
| 4,668,768 | 5/1987 | Mendiratta et al. | 528/493 |
| 4,946,940 | 8/1990 | Guckes et al. | 528/491 |

FOREIGN PATENT DOCUMENTS

| | | |
|---|---|---|
| 0184935 | 6/1986 | European Pat. Off. |
| 4118230 | 6/1992 | Fed. Rep. of Germany |
| 4117751 | 12/1992 | Fed. Rep. of Germany |

*Primary Examiner*—Morton Foelak
*Attorney, Agent, or Firm*—William H. Pittman

[57] ABSTRACT

A process for isolating high bulk density polymer resins from polymer resin solutions is provided herein. More particularly, a polymer resin having a glass transition temperature of greater than about ambient temperature is isolated from a polymer resin solution by subjecting the polymer resin solution a gaseous component under moderate pressure and ambient temperature.

22 Claims, No Drawings

PROCESS FOR ISOLATING POLYMER RESINS FROM SOLUTIONS

FIELD OF THE INVENTION

This invention relates to a process for isolating polymers from solutions. More particularly, the invention relates to a novel process for precipitating polymer resins as high bulk density solids from solutions by directly subjecting polymer resin solutions to gaseous carbon dioxide under moderate pressures at about ambient temperature.

BACKGROUND OF THE INVENTION

Polymerization reactions generally fall into one of two classes. The classes are condensation polymerizations and addition polymerizations. Common to the above-mentioned polymerization reactions is the employment of organic solvents as a medium which comprises the monomers to be polymerized and the polymer resins to be formed. Thus, the product generally obtained in polymerization reactions is polymer resins dissolved in organic solvents (hereinafter polymer resin solutions).

Additionally, polymer resins are also found solubilized in organic solvents as a result of recycling processes. For instance, a variety of waste polymer resins such as those obtained from automobile bumpers and computer casings are frequently recycled. Said waste polymer resins are often sand blasted to remove paint and subsequently ground into flakes and powders. The flakes and powders are then solubilized in organic solvents. Insolubles such as fillers, metals, paper, impact modifiers and coatings are filtered off and polymer resin solutions which often have soluble components such as dyes, stabilizers and flame retardants are obtained.

It is therefore noted that the instant novel process is effective for precipitating polymer resins as high bulk density solids from polymer resin solutions regardless of how the polymer resins originate in said solutions. Further, when said polymer resin solutions are the product of a polymerization reaction, they may often be referred to as virgin polymer resin solutions.

Many of the conventional processes utilized to isolate polymer resins from solutions are inefficient, energy intensive as well as environmentally unfavorable. This is true because the polymer resins that are isolated via conventional processes are often of low bulk density since they possess both porous particles and poor particle size distribution. In addition, they are often contaminated with low molecular weight compounds such as residual catalysts and unreacted monomers. Because of this, their chemical and physical properties (e.g., reactivity, color, odor and impact strength) are adversely altered. Moreover, conventional processes employ large volumes of volatile organic solvents as well as high energy/high temperature process steps which invariably increases the amount of organic waste polluting the environment.

It is of increasing interest to isolate polymer resins as high bulk density solids from polymer resin solutions via a process that does not adversely affect the environment. The instant invention, therefore, is based on the discovery of a novel process for isolating polymer resins as high bulk density solids from polymer resin solutions. The polymer resins possess glass transition temperatures (Tg) greater than about ambient temperature, but preferably at least about 50° C. greater than ambient temperature. Additional novel embodiments of the instant invention include directly subjecting the polymer resin solutions to gaseous carbon dioxide under moderate pressures at about ambient temperature. Further, in the instant invention high bulk density is defined as about 0.2 g/cm$^3$ to about 1.0 g/cm$^3$ but preferably about 0.3 g/cm$^3$ to about 0.6 g/cm$^3$. Moderate pressures are defined as about 300 psig to about 800 psig. However, a pressure of about 600 psig is often preferred.

It is noted that since the instant process is conducted at an operating temperature of about ambient temperature, the Tg values of the polymer resins isolated in the instant process are not intended to be lower than said operating temperature. Thus, said polymer resins are by definition glassy polymer resins and not rubbery polymer resins at about ambient temperature. Additionally, the Tg values of said polymer resins will increase when they are isolated from the solution and dried since organic solvents typically lower the Tg values of polymer resins.

DESCRIPTION OF THE PRIOR ART

Processes for isolating polymeric resins are disclosed in the art. In commonly assigned U.S. Pat. Nos. 4,603,194 and 4,634,761, methods are disclosed for volatilizing organic solvents from admixtures in order to isolate polymer resins. In said methods, polymer resin containing admixtures are formed and heated to temperatures as high as 100° C. (or about 30° C. above the boiling point of the organic solvents) in order to completely volatilize the organic solvents and recover agglomerated polymer resins and polymer granules.

Additionally, in commonly assigned U.S. Pat. No. 4,668,768, a process is disclosed for isolating polymer resins from organic solvents by combining a polymer resin containing organic solvent with a water and organic antisolvent separation medium in order to form a polymer resin suspended in the aqueous phase and an organic solvent phase. The organic solvent phase is removed via vaporization at about 10° C. below to about 30° C. above the boiling point of the organic solvent wherein a powdery polymer precipitate is subsequently recovered from the aqueous phase.

Still other investigators have focused their attention on isolating polymer resins from solution. In U.S. Pat. No. 4,946,940 and European patent application 0184935, rubbery polymers which characteristically have glass transition temperatures significantly lower than operating temperatures are separated from solutions by introducing into said solutions phase separation agents in order to produce polymer rich liquid phases as well as solvent rich liquid phases. Said polymer rich liquid phases are then subsequently subjected to additional processing steps such as heating steps in order to volatilize the organic solvent and recover said rubbery polymers from solution.

Finally, in German Patents 4,117,751 and 4,118,230, attempts are disclosed for recovering polymers from solution. In said patents, polymer containing solutions are combined with carbon dioxide containing fluids in a multi-step process and subjected to elevated temperatures in order to isolate the desired polymers. The resulting solids are of low bulk density and are expected to retain all low molecular weight contaminants, oligomers and residual monomers.

The instant invention, therefore, is patentably distinguishable from the above-mentioned processes, since among other reasons, it is directed to a process for precipitating polymer resins as high bulk density solids from polymer resin solutions. The polymer resins possess Tg values greater than about ambient temperature, but preferably at least about 50° C. greater than ambient temperature. Additional novel embodiments of the instant invention include directly subjecting the polymer resin solutions to gaseous carbon dioxide under moderate pressures at about ambient temperature. Further, the process is conducted at about ambient temperature to ensure that volatile organic solvent emissions are minimized.

SUMMARY OF THE INVENTION

The instant invention is based on the discovery of a novel process for precipitating polymer resins as high bulk density solids from polymer resin solutions. Said polymer resins have Tg values greater than about ambient temperature, but preferably at least about 50° C. greater than ambient temperature. It is not intended for said Tg values to be below the operating temperature of the novel process. This ensures that the polymer resins in solution will displace out of solution as high bulk density polymer resin solids. Hence, polymer resin solids precipitate and the carbon dioxide containing solvent now deplete in polymer resin may be isolated under a constant moderate pressure from said precipitate via environmentally safe and inexpensive processes such as filtration.

An important aspect of the instant invention, therefore, is the isolation of polymer resins as high bulk density solids without employing environmentally hazardous and expensive steps which include solvent removal from polymer resin solutions entirely by vaporization or precipitations with anti-solvents. Also, no additional organic solvent is added to the polymer resin solution.

Additional features and advantages will be made evident upon reference to the following detailed description.

DETAILED DESCRIPTION OF THE PREFERRED EMBODIMENT

The polymer resins that may be isolated from solution via the instant process include those which have a molecular weight average above about 2,000 and typically range from about 5,000 to about 300,000. It is noted, however, that the molecular weight range of the isolated high bulk density polymer resin solids may be altered by varying the pressure. The polymer resins that may be isolated via the instant process may have a degree of polymerization up to 10,000. Further, the term "polymer resin" is not intended to be limiting and includes oligomers, graft polymers, block copolymers, terpolymers, branched polymers, thermoplastic blends and mixtures thereof. Examples of suitable thermoplastics that may be employed in the instant invention include polycarbonates, polystyrene, polyethylene ether, polyphenylene ethers, polyetherimides, polyesters including polyethylene terephthalate and polybutylene terephthalate.

In accordance with the present invention, examples of solvents from which polymer resins may be isolated as high bulk density solids include chlorinated and brominated hydrocarbons having from 1 to about 20 carbon atoms. Such solvents include methylene chloride, 1,1,2,2-tetrachloroethane, 1,2-dichloroethylene, chlorobenzene, chloroform, dichlorobenzene, 1,1,2-trichloroethane and aromatic and aliphatic hydrocarbon solvents such as benzene, xylene, toluene, pyridine, mesitylene, pentane, hexane and heptane as well as mixtures thereof.

It is further noted that carbon dioxide is the preferred gaseous component employed in the instant invention. However, it is expected that gaseous components which display solubility properties in organic solvents similar to those of carbon dioxide in methylene chloride or toluene may also be employed. Said gaseous components include the inert gases, nitrogen, oxygen as well as gases consisting of 1 to 4 carbon atoms.

In accordance with the present invention, polymer resins may be isolated as high bulk density solids from polymer resin solutions via a process which comprises the steps of:

(a) introducing into a reaction vessel a polymer resin solution which consists essentially of an organic solvent and a polymer resin having a glass transition temperature greater than about ambient temperature;

(b) contacting said polymer resin solution with a gaseous component under moderate pressure to produce a solution comprising a dissolved gaseous component;

(c) maintaining the solution comprising a dissolved gaseous component at an operating temperature of about ambient temperature;

(d) allowing said polymer resin to precipitate as a solid from the solution comprising a dissolved gaseous component; and (e) isolating said solid from said solution comprising a dissolved gaseous component.

In the instant process, the polymer resin concentration in said polymer resin solution is often about 10-35 weight percent based on total weight of the polymer resin solution. However, a polymer resin solution of at least about 20 weight percent is preferred when the weight average molecular weight of the polymer resin being isolated is less than about 20,000. Further, the high bulk density polymer resin may be isolated from said polymer resin solution by conventional methods such as filtration. During isolation, the moderate pressure ($CO_2$ pressure) is maintained until the solution comprising dissolved gaseous component and polymer resin precipitated as a high bulk density solid are separated. This prevents the solid polymer resin from redissolving.

An additional, simultaneous and unexpected feature of the instant invention is that at least about 25-35% of all oligomers (that may be originally present in the polymer resin solution) having a weight average molecular weight of less than about 5,000 remain in solution, and that at least about 55-65% of all monomers and dimers (that may be originally present in the polymer resin solution) having a weight average molecular weight of up to about 500 remain in solution after the polymer resin precipitates as a high bulk density solid.

Moreover, when employing a moderate pressure of about 600 psig, at least about 30% of all oligomers (that may be originally present in the polymer resin solution) having a weight average molecular weight of less than about 5,000 remain in solution, and at least about 60% of all monomers and dimers (that may be originally present in the polymer resin solution) having a weight average molecular weight of up to about 500 remain in solution.

Further, the instant process is often enhanced by agitation which may be typically set between about 1,000-2,250 rpms (tip speed of about 5-12 ft/sec). When the above-mentioned polymer resin solution is the product of a recycling process, it is expected that at least about 80% of soluble nonpolymer resin components (that may be originally present in the reaction solution) which include, for example, dyes, stabilizers and flame retardants will remain in solution after the high bulk density polymer resin precipitates.

It is often preferred that the organic solvent employed in the instant process is methylene chloride and the preferred polycarbonates recovered via the instant process are bisphenol A polycarbonates and copolymers prepared therefrom. Additional polycarbonates that may be isolated via the instant process are copolyestercarbonates which are prepared from aliphatic alpha omega dicarboxylic acids such as those described in U.S. Pat. Nos. 4,983,706 and 5,021,081 which are incorporated herein by reference. It is also noted that the instant process may be either batch or continuous.

The following examples and table are provided to further illustrate and facilitate the understanding of the invention. All products obtained can be confirmed by conventional techniques such as proton and carbon 13 nuclear magnetic resonance spectroscopy, x-ray crystallography as well as high performance liquid chromatography.

EXAMPLE 1

A 500 cm$^3$ pressure vessel was charged with 203.5 grams of a 14% by weight polycarbonate (35,000 weight average molecular weight) in methylene chloride solution (175.01 g methylene chloride, 28.49 g polycarbonate). Carbon dioxide was introduced into the reaction solution at a pressure of 530 psig and monitored in through mass flow meters. Agitation in the reaction vessel was set at 2250 rpms and polycarbonate precipitation was noticed within one minute. The system was allowed to reach equilibrium which was indicated by the absence of further uptake of carbon dioxide by the system. The solution comprising dissolved CO$_2$ was isolated from the precipitate under pressure through a 10 micron filter placed internally. The precipitate was removed from the vessel and dried to 27.21 g. Percent yield 95.5%, bulk density 0.369 g/cm$^3$.

EXAMPLE 2

A 500 cm$^3$ pressure vessel was charged with 220.5 grams of a 21% by weight polycarbonate (20,000 weight average molecular weight) in methylene chloride solution. Carbon dioxide was introduced into the reaction solution at a pressure of 595 psig and monitored in through mass flow meters. Agitation in the reaction vessel was set at 2250 rpms and polycarbonate precipitation was noticed within one minute. The system was allowed to reach equilibrium which was indicated by the absence of further up take of carbon dioxide by the system. The solution comprising dissolved CO$_2$ was isolated from the precipitate under pressure through a 10 micron filter placed internally. The precipitate was removed from the vessel and dried to 44.96 g. Percent yield 97.1%, bulk density 0.400 g/cm$^3$.

The data in the table which follows has been arranged to show that polymer resins recovered via the instant process unexpectedly possess high bulk densities as well as low Mw/Mn values. All entries have been prepared in the manner described by Examples 1 and 2.

| Entry | Weight % Polycarbonate* in solution | CO$_2$ Pressure (psig) | Bulk density of isolated polycarbonate g/cm$^3$ | Mw/Mn** |
|---|---|---|---|---|
| 1 | 14 | 575 | 0.417 | 2.29 |
| 2 | 14 | 600 | 0.449 | 2.45 |
| 3 | 14 | 700 | 0.337 | 2.62 |
| 4 | 17 | 655 | 0.417 | 2.61 |
| 6 | 17 | 786 | 0.400 | — |

*Polycarbonate of weight average molecular weight 35,000 and Mw/Mn equal to 2.72.
**Low Mw/Mn compared to polycarbonate in solution confirms that low molecular weight oligomers, unreacted monomers and impurities do remain in solution.

We claim:

1. A process for isolating polymer resins from polymer resin solutions which comprises the steps of:
   (a) introducing into a reaction vessel a polymer resin solution which consists essentially of an organic solvent and a polymer resin having a glass transition temperature greater than about ambient temperature and having a bulk density of about 0.2 cm$^3$ to about 1.0 g/cm$^3$.
   (b) contacting said polymer resin solution with a gaseous component under moderate pressure to produce a solution comprising dissolved gaseous component;
   (c) maintaining the solution comprising dissolved gaseous component at an operating temperature of about ambient temperature whereby said polymer resin in solution precipitates as a solid from said solution; and
   (d) isolating said solid from said solution comprising dissolved gaseous component.

2. A process in accordance with claim 1 wherein said high bulk density sold has a bulk density of about 0.3 g/cm$^3$ to about 0.6 g/cm$^3$.

3. A process in accordance with claim 1 wherein said polymer resin is a polyphenylene ether.

4. A process in accordance with claim 5 wherein said organic solvent is toluene.

5. A process in accordance with claim 1 wherein said polymer resin is a polycarbonate.

6. A process in accordance with claim 7 wherein said polycarbonate is a copolyestercarbonate.

7. A process in accordance with claim 6 wherein said solvent is methylene chloride.

8. A process in accordance with claim 1 wherein said glass transition temperature is at least about 50° C. greater than ambient temperature.

9. A process in accordance with claim 1 wherein said polymer resin solution is about 10-35 weight percent polymer resin based on total weight of the polymer resin solution.

10. A process in accordance with claim 1 wherein said gaseous component is carbon dioxide.

11. A process in accordance with claim 1 wherein said moderate pressure is about 300-800 psig.

12. A process in accordance with claim 11 wherein said moderate pressure is about 600 psig.

13. A process in accordance with claim 1 wherein said solid is isolated from said solution comprising dissolved gaseous component while maintaining said moderate pressure.

14. A process in accordance with claim 13 wherein said moderate pressure is about 600 psig.

15. A process in accordance with claim 14 wherein said solid is isolated from said solution comprising dissolved gaseous component by filtering off the solution comprising dissolved gaseous component.

16. A process in accordance with claim 1 wherein said polymer resin solution is a virgin polymer resin solution.

17. A process in accordance with claim 16 wherein said polymer resin solution is a product of a recycling process.

18. A process in accordance with claim 1 wherein said solution comprising dissolved gaseous component is agitated at about 1,000–2,250 rpms.

19. A process in accordance with claim 16 wherein at least about 30% of all oligomers having a weight average molecular weight of less than about 5,000 and originally present in said polymer resin solution remain in the polymer resin solution after the solid has precipitated.

20. A process in accordance with claim 19 wherein at least about 60% of all monomers and dimers having a weight average molecular weight of up to about 500 and originally present in said polymer resin solution remain in the polymer resin solution after the solid has precipitated.

21. A process in accordance with claim 1 wherein at least about 25–35% of all oligomers having a weight average molecular weight of less than about 5,000 and originally present in said polymer resin solution remain in solution after the solid has precipitated.

22. A process in accordance with claim 21 wherein at least about 55–65% of all monomers and dimers having a weight average molecular weight of up to about 500 and originally present in said polymer resin solution remain in solution after the solid has precipitated.

* * * * *